United States Patent
Storck

(10) Patent No.: US 11,994,978 B2
(45) Date of Patent: May 28, 2024

(54) AUTOMATED VERIFICATION OF A TEST MODEL FOR A PLURALITY OF DEFINED BDD TEST SCENARIOS

(71) Applicant: Siemens Aktiengesellschaft, Munich (DE)

(72) Inventor: Stephan Storck, Bad Feilnbach-Au (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 244 days.

(21) Appl. No.: 17/704,364

(22) Filed: Mar. 25, 2022

(65) Prior Publication Data

US 2022/0334954 A1 Oct. 20, 2022

(30) Foreign Application Priority Data

Apr. 16, 2021 (EP) .................... 21168972

(51) Int. Cl.
*G06F 11/36* (2006.01)
*G06F 9/451* (2018.01)
(Continued)

(52) U.S. Cl.
CPC ........ *G06F 11/3684* (2013.01); *G06F 11/368* (2013.01); *G06F 11/3688* (2013.01);
(Continued)

(58) Field of Classification Search
CPC ............. G06F 11/3664; G06F 11/3684; G06F 11/3688; G06F 9/451; G06N 5/04; G06T 17/05; G06T 19/20
See application file for complete search history.

(56) References Cited

U.S. PATENT DOCUMENTS

2020/0073788 A1  3/2020  Saha et al.
2020/0089594 A1* 3/2020  Zhou ................... G06F 11/3664

FOREIGN PATENT DOCUMENTS

EP  3032425 A1  6/2016
EP  3693860 A1  8/2020
WO  WO 2010033521 A2  3/2010

OTHER PUBLICATIONS

Yu et al., CN 104424060, (translation), Jan. 23, 2018, 21 pgs <CN_104424060.pdf>.*

(Continued)

*Primary Examiner* — Tuan A Vu
(74) *Attorney, Agent, or Firm* — Schmeiser, Olsen & Watts LLP

(57) ABSTRACT

A—method for automated verification of a test model for BDD test scenarios including receiving the test model to be verified; generating a model path tree using a model-based path analysis based on the test model; filtering any test step of the plurality of test steps of the paths in the model path tree; d. identifying any test step with a missing alternative test step in another alternative path of the plurality of paths in the model path tree using machine learning based on the model path tree; adding at least one missing alternative test step to the test model after identification of at least one test step, resulting in at least one alternative path; and providing the identified test step, the identified at least one missing alternative test step, the at least one alternative path and/or the at least one alternative BDD test scenario as output data.

4 Claims, 2 Drawing Sheets

Figure 1:
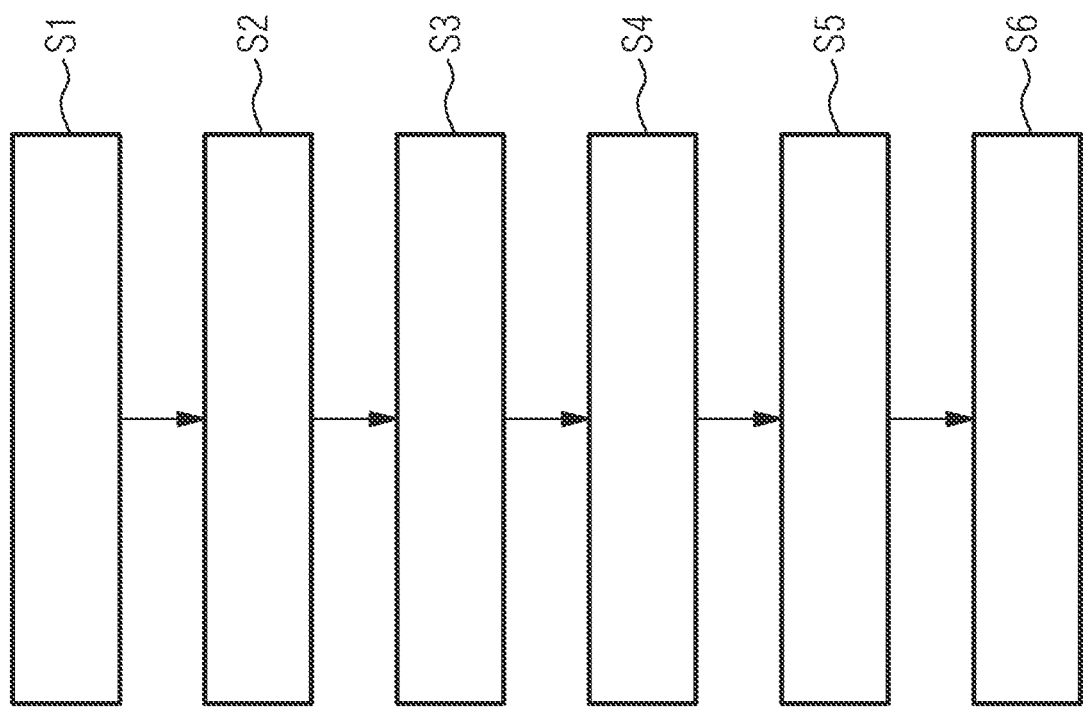

(51) Int. Cl.
  *G06N 5/04* (2023.01)
  *G06T 17/05* (2011.01)
  *G06T 19/20* (2011.01)

(52) U.S. Cl.
  CPC ............... *G06F 9/451* (2018.02); *G06N 5/04* (2013.01); *G06T 17/05* (2013.01); *G06T 19/20* (2013.01)

(56) References Cited

OTHER PUBLICATIONS

Dwarakanath et al, AU 2016201530, Nov. 24, 2016, 28 pgs <AU_2016201530.pdf>.*
JP 5404721, (translation), Feb. 5, 2014, 10 pgs <JP_5404721.pdf>.*
Wang, Sha, CN 109960639, (translation), Jul. 2, 2019, 16 pgs <CN_109960639.pdf>.*

* cited by examiner

AUTOMATED VERIFICATION OF A TEST MODEL FOR A PLURALITY OF DEFINED BDD TEST SCENARIOS

CROSS-REFERENCE TO RELATED APPLICATIONS

This application claims priority to EP Application No. 21168972.4, having a filing date of Apr. 16, 2021, the entire contents of which are hereby incorporated by reference.

FIELD OF TECHNOLOGY

The following relates to a computer-implemented method for automated verification of a test model for a plurality of defined BDD test scenarios. Further, the following relates to a corresponding computing unit and computer program product.

BACKGROUND

In recent years, Behavior Driven Development (BDD) has emerged as an agile software development approach for the specification and execution of automated acceptance tests of software programs. BDD aims to simplify Test-Driven Development (TDD). TDD is a software development methodology which essentially states that for each unit of software, a software developer must define specific test sets for the unit first, then implement the unit and finally verify that the implementation of the unit makes the tests succeed. BDD combines Test-Driven Development (TDD), Object-Oriented Analysis (OOA), Object-Oriented Design (OOD) and Domain-Driven Design (DDD) to provide a unified language and approach for handling such a software development process from requirements analysis to implementation.

BDD is largely facilitated through the use of a simple domain-specific language (DSL) using natural language constructs (e.g., English-like sentences) that can express the behavior and the expected outcomes of the software. This 'ubiquitous language' can be understood and jointly used by quality managers, domain experts, software developers and customers. BDD employs a semi-formal format for behavioral specification of the software, which is borrowed from user story specifications from the field of object-oriented analysis and design.

To this end, the behavior of each software unit is decomposed into so-called scenarios, each scenario testing one individual aspect of the software. Each scenario is in turn divided into steps, which describe a desired outcome of the respective aspect of the software starting from given initial conditions and running through predefined events. Each scenario with its steps is formulated as a natural language script, which can later be translated into executable specifications as well as executable test scripts in an automated way. The executable test scripts can then be executed as automated tests for testing the software for its correct implementation. The software requirements within the test scripts are usually written in "given-when-then" sentences based on the ubiquitous language of domain-driven design. This is intended to facilitate the transition between the language used to define the domain-driven requirements and the programming language used to implement them.

One test automation framework widely used for automated acceptance tests written in BDD style is called Cucumber. Most test automation frameworks, including Cucumber, are based on the Gherkin notation as the DSL. Cucumber comprises a plain language parser for the Gherkin notation. The desired behavior of the software is formulated within Gherkin in a declarative way:
GIVEN (precondition/initial conditions) . . .
WHEN (event/action/trigger) . . .
THEN (effect to be observed/system response) . . .

Such descriptive languages are semi-formal with the capital words (GIVEN, WHEN, THEN) serving as pre-designated keywords. Due to the simple grammar and the natural language keywords, the BDD requirements can be understood and manually executed by technical testers. Cucumber runs through these keywords and processes them step by step, thereby mapping every non-capital phrase following these keywords to a parameterized function call. Traditionally, Ruby scripts were used for this purpose within Cucumber, which replace the test steps by automated program calls and thus make the BDD description automatically executable. However, Cucumber now supports a variety of different programming languages through various implementations, including Java and C#.

BDD is easy to understand and straightforward to implemented. However, in large and complex use cases, the approach with its textual and manually created scenarios may lack the manageability to handle a large number of scenarios and complex tests sets while ensuring completeness and consistency. For the development of complex systems, approaches like Model Based Testing (MBT) or Keyword Based Testing (KBT) are often seen as more appropriate. MBT approaches allow reviewing and verifying the completeness and consistency of even complex test scenarios using a visual representation of the scenarios, e.g., using diagrams in Unified Modelling Language (UML). However, MBT has to be individually embedded into the existing development and test process for each software component.

SUMMARY

An aspect relates to a computer-implemented method for automated verification of a test model for a plurality of defined BDD test scenarios in an efficient and reliable manner.

This problem is according to one aspect of embodiments of the invention solved by a com-puter-implemented method for automated verification of a test model for a plurality of Behavior Driven Development, BDD, test scenarios, the method comprising:
 a. receiving the test model to be verified;
 b. generating a model path tree using a model-based path analysis based on the test model; wherein
  the model path tree comprises a plurality of paths, each path assigned to a respective BDD test scenario of the plurality of BDD test scenarios; wherein
  each path comprises a plurality of test steps and respective intersection information;
 c. filtering any test step of the plurality of test steps of the paths in the model path tree to be filtered regarding their impact on test coverage or another filter criterion using natural language processing based on the model path tree;
 d. identifying any test step with a missing alternative test step in another alternative path of the plurality of paths in the model path tree using machine learning based on the model path tree;
 e. adding at least one missing alternative test step to the test model after identification of at least one test step, resulting in at least one alternative path; wherein the at least one alternative path is assigned to at least one alternative BDD test scenario; and f. providing the identified test step, the identified at least one missing alternative test step, the at least one alternative path and/or the at least one alternative BDD test scenario as output data.

Accordingly, embodiments of the invention are directed to a computer-implemented method for automated verification of a test model for a plurality of BDD test scenarios. Thereby, the test model serves as input data for the method steps and can be derived in different ways. For example, the test model can be derived from BDD scenarios based on BDD step definitions and similarity analysis using Neuro Linguistic Programming and machine learning mechanisms. Alternatively, other approaches can be applied.

In a first step, the model-based path analysis is applied on the provided test model as input data to generate a model path tree. In other words, the test model is processed into a tree structure with paths comprising test steps and respective intersection information. Thereby, the intersection information can comprise paths like branch and merge locations. Each path is associated with a respective BDD test scenario.

In a next step, natural language processing is applied on the model path tree to filter test steps using a filter criterion. In other words, irrelevant or not essential test steps are removed from the model path tree. This step is essential to reduce the amount of test steps in the model path tree for step d., according to which identification. This step results in zero to at least one filtered test steps. In other words, in this case, the test model is already complete.

In the next step machine learning (e.g., a machine learning model such as a pre-learned or trained neural network, learned on previous projects or project examples) is applied on the model path tree to identify test steps with missing alternative test steps in another alternative path of the model path tree. In other words, the model path tree, comprising the plurality of the paths and its test steps, is analyzed to identify additional branches impacting the test coverage or any other optimization criteria. This step results in zero to at least one identified test step with missing alternatives, zero to at least one alternative path and/or zero to at least one alternative BDD test scenario.

According to which, at least one missing alternative test step is added to the test model after identification of one or more test steps, resulting in one or more alternative path. Thus, the model path tree is extended. The extension takes place.

Hence, the output data is provided in the last step after identification of at least one missing test step. Accordingly, having identified one or more missing test steps, in this case, the output data is provided.

In the event that no or zero test steps are missing and thus cannot be identified in step d., in this case, other output data can be provided, for example a notification no test step is missing.

The advantage of embodiments of the present invention are that missing test steps and hence associated alternative BDD test scenarios can be efficiently determined. Embodiments of the present invention are also applicable on huge amounts of data, hence big data, due to the pre-filtering. The identification ensures the consistency and the completeness of BDD test scenarios.

Moreover, after identification, the alternative BDD test scenarios can be handled in an efficient and reliable manner, the received test model received in step a. can be adapted depending on the identified missing test steps and alternative BDD test scenarios.

The adapted test model can serve as basis or input for the generation of the executable test scripts for the BDD test scenarios. This way, the specification and execution of automated acceptance tests of software programs can be significantly improved.

To the contrary, according to prior art, known approaches are solely manual and are only applicable for reasonably small projects.

Moreover, embodiments of the present invention relate to Behavior-Driven Development (BDD) and combines traditional BDD advantages with Model Based Testing (MBT) for improved convenience and automatization in case of complex software packages According to an aspect, the method further comprises at least one step of the following steps:
transmitting the output data to a computing unit;
storing the output data in a volatile or non-volatile storage unit;
displaying the output data on a display unit of a computing unit to a user;
providing the output data via an interface of a computing unit to a user;
extending the test model with the alternative BDD test scenario; and
generating executable test scripts for the BDD test scenarios based on the test model and/or extended test model.

Accordingly, the input data, data of intermediate method steps and/or resulting output data can be further handled. The output data is the identified test step and/or the alternative BDD test scenario. One or more actions can be performed. The action can be equally referred to as measure.

These actions can be performed by one or more technical units, such as computing unit or robot unit. The actions can be performed gradually or simultaneously. Actions include e.g., storing and processing steps. The advantage is that appropriate actions can be performed in a timely manner.

In an embodiment, the identified alternative BDD test scenarios are considered in the test model which serves as input or basis for the generation of executable test scripts for the BDD test scenarios, see further above. Hence, in other words, the test model is extended with the alternative BDD test scenarios.

For example, according to a use case, the generated output data provides significant input to a test manager or analyst to extend and optimize existing BDD scenarios to ensure adequate test coverage.

A further aspect of embodiments of the invention is a computing unit e.g., robot unit or another autonomous unit.

The unit may be realized as any devices, or any means, for computing, for executing a software, an app, or an algorithm. For example, the unit may consist of or comprise a central processing unit (CPU) and/or a memory operatively connected to the CPU. The unit may also comprise an array of CPUs, an array of graphical processing units (GPUs), at least one application-specific integrated circuit (ASIC), at least one field-programmable gate array, or any combination of the foregoing. The unit may comprise at least one module which in turn may comprise software and/or hardware. Some, or even all, modules of the unit may be implemented by a cloud computing platform.

A further aspect of embodiments of the invention is a computer program product (non-transitory computer readable storage medium having instructions, which when executed by a processor, perform actions).

BRIEF DESCRIPTION

Figure 2:
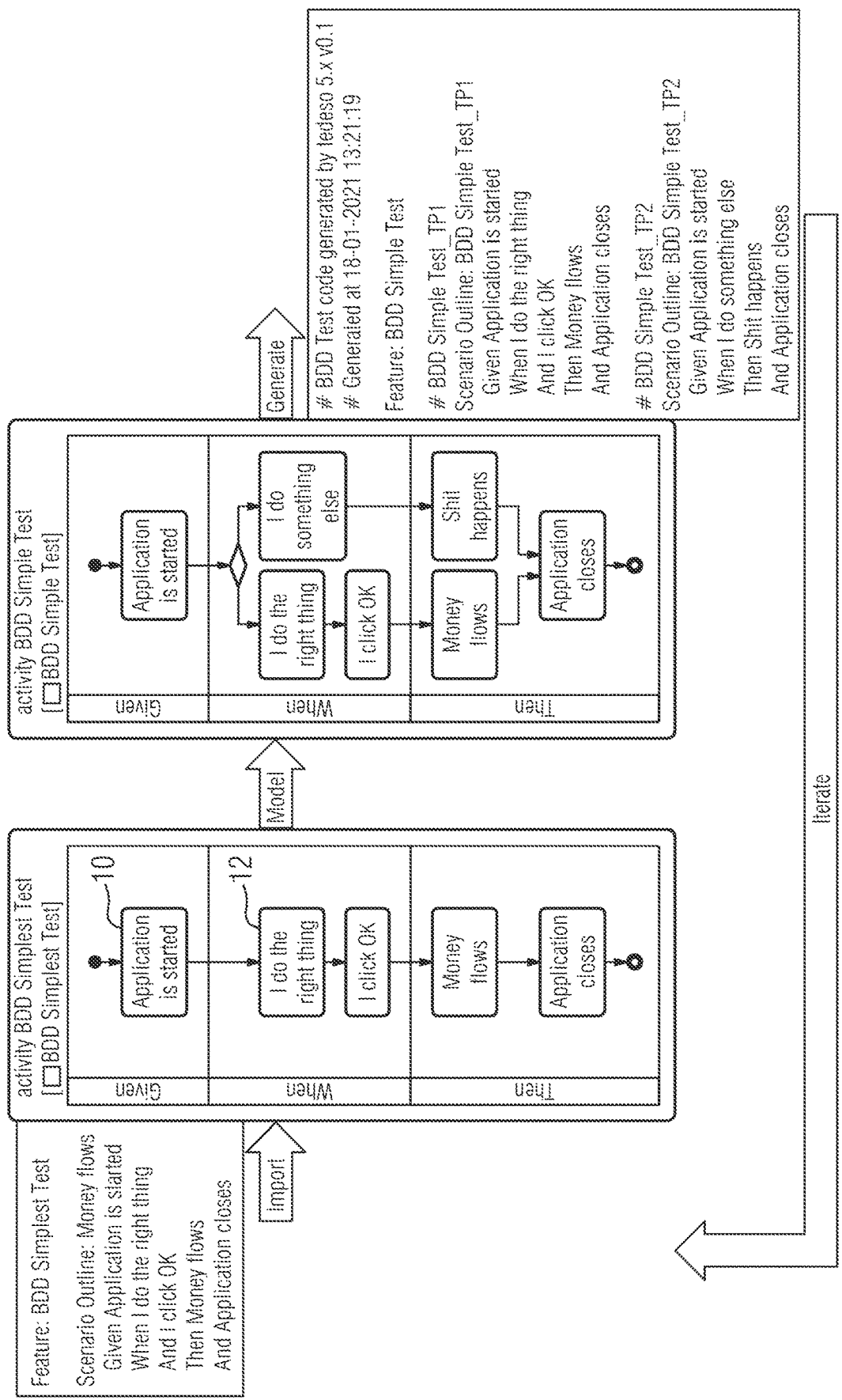

Some of the embodiments will be described in detail, with reference to the following figures, wherein like designations denote like members, wherein:

FIG. 1 shows a schematic diagram of the method according to embodiments of the invention; and FIG. 2 shows a schematic representation of an alternative path in the model path tree according to embodiments of the invention.

DETAILED DESCRIPTION

FIG. 1 illustrates a flowchart of the method according to embodiments of the invention with the method steps S1 to S6.

Providing the Input Data S1

First, the input data in form of the test model is provided S1.

Transformation of the test model into the model path tree S2

The model-based representation of the BDD test scenarios allows to utilize model-based analysis approaches, like path analysis. The model-based path analysis generates a tree structure describing the structure of the defined BDD test scenarios and the different alternative paths 10, S2. Thereby, the paths comprise test steps 12.

Filtering Test Steps S3

Further, NLP is used to filter out activities in the model path tree which are not relevant in view of e.g., test coverage.

Further, the number of missing alternative paths (additionally required BDD scenarios) can be estimated using specific metrics, like path complexity, etc.

Identification of Missing Test Steps S4

Machine learning is used to compare the paths of the model path tree with previous project examples and the resulting impact on test coverage.

As illustrated in FIG. 2, one path comprises the test step "I click OK", whereas the other path does not comprise the test step "I click OK". Accordingly, the missing test step is existent in the other alternative path. This identified test step and alternative path is assigned to the alternative BDD test scenario S5.

Providing the Output Data S6

The output, the alternative BDD test scenario, of the method can be used to extend and optimize the BDD test model to achieve the desired test coverage.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for automated verification of a test model for a plurality of Behavior Driven Development (BDD) test scenarios, the method comprising:
   a. receiving the test model to be verified;
   b. generating a model path tree using a model-based path analysis based on the test model; wherein
      the model path tree comprises a plurality of paths, each path assigned to a respective BDD test scenario of the plurality of BDD test scenarios; wherein
      each path comprises a plurality of test steps and respective intersection information;
   c. filtering any test step of the plurality of test steps of the paths in the model path tree to be filtered regarding their impact on test coverage or another filter criterion using natural language processing based on the model path tree;
   d. identifying any test step with a missing alternative test step in another alternative path of the plurality of paths in the model path tree using machine learning based on the model path tree;
   e. adding at least one missing alternative test step to the test model after identification of at least one test step, resulting in at least one alternative path; wherein
      the at least one alternative path is assigned to at least one alternative BDD test scenario; and
   f. providing the identified test step, the identified at least one missing alternative test step, the at least one alternative path and/or the at least one alternative BDD test scenario as output data.

2. The computer-implemented method according to claim 1, wherein the method further comprises:
   transmitting the output data to a computing unit;
   displaying the output data on a display unit of a computing unit to a user;
   providing the output data via an interface of a computing unit to a user;
   extending the test model with the alternative BDD test scenario; and
   generating executable test scripts for the BDD test scenarios based on the test model and/or extended test model.

3. A computing unit for performing the method steps according to claim 1.

4. A computer program product, comprising a computer readable hardware storage device having computer readable program code stored therein, said program code executable by a processor of a computer system to implement a method according to claim 1, when the computer program product is running on a computer.

* * * * *